United States Patent
Isaji et al.

(10) Patent No.: US 8,195,363 B2
(45) Date of Patent: Jun. 5, 2012

(54) STEERING CONTROL DEVICE FOR VEHICLE

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 548 days.

(21) Appl. No.: 12/462,928

(22) Filed: Aug. 11, 2009

(65) Prior Publication Data

US 2010/0082203 A1    Apr. 1, 2010

(30) Foreign Application Priority Data

Sep. 30, 2008  (JP) .................. 2008-252544

(51) Int. Cl.
*B62D 6/00* (2006.01)
*B62D 1/02* (2006.01)

(52) U.S. Cl. ............... 701/41; 701/514; 701/301

(58) Field of Classification Search .............. None
See application file for complete search history.

(56) References Cited

U.S. PATENT DOCUMENTS

| | | |
|---|---|---|
| 5,661,650 A | 8/1997 | Sekine et al. |
| 5,854,987 A | 12/1998 | Sekine et al. |
| 7,571,053 B2 | 8/2009 | Ishikura |
| 2002/0044080 A1* | 4/2002 | Shirai et al. ............ 342/70 |
| 2005/0228580 A1* | 10/2005 | Winner et al. ............ 701/200 |

FOREIGN PATENT DOCUMENTS

| | | |
|---|---|---|
| JP | 06-298108 | 10/1994 |
| JP | 07-105498 | 4/1995 |
| JP | 09-146641 | 6/1997 |
| JP | 09-263200 | 10/1997 |
| JP | 10-167100 A * | 6/1998 |
| JP | 10-325869 | 12/1998 |
| JP | 2007-122569 | 5/2007 |
| JP | 2007-296947 | 11/2007 |
| JP | 2008-059324 | 3/2008 |

\* cited by examiner

*Primary Examiner* — Michael J. Zanelli
(74) *Attorney, Agent, or Firm* — Harness, Dickey & Pierce, PLC

(57) ABSTRACT

A steering control device for a vehicle includes: a position detection sensor for detecting a position of a road boundary and accessories in front of the vehicle; a road curvature radius calculator for calculating an outer curvature radius of a road; a turning radius calculator for calculating an appropriate turning radius; an appropriate distance calculator for calculating an appropriate road boundary distance between a front end of the vehicle and the road boundary in front of the vehicle; an actual distance detector for detecting an actual road boundary distance between the front end of the vehicle and the road boundary in front of the vehicle; and a steering wheel angle determination element for determining acceptability of the turning angle of the steering wheel based on comparison between the appropriate road boundary distance and the actual road boundary distance.

5 Claims, 10 Drawing Sheets

FIG. 11

$$R_e = \sqrt{\left[\frac{1}{2} \times \frac{(2 \times W_L \times W_R + W_R^2) + (D_R^2 - D^2) - 2 \times \left[\frac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}} \times (D_R - D)\right]}{W_R}\right]^2 + \left\{D_L - \left[\frac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}}\right]\right\}^2}$$

FIG. 12

$$2 \times a = \frac{(2 \times W_L \times W_R + W_R^2) + (D_R^2 - D^2) - 2 \times \left[ \dfrac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}} \right] \times (D_R - D)}{W_R}$$

$$a = \frac{1}{2} \times \frac{\left( (2 \times W_L \times W_R + W_R^2) + (D_R^2 - D^2) - 2 \times \left[ \dfrac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}} \right] \times (D_R - D) \right)}{W_R}$$

FIG. 13

$$R_e^2 = \left\{\frac{1}{2} \times \frac{\left(2 \times W_L \times W_R + W_R^2\right) + \left(D_R^2 - D^2\right) - 2 \times \left[\frac{W_L \times \left(2 \times W_L \times W_R + W_R^2\right) - W_R \times W_L^2 + W_L \times \left(D_R^2 - D^2\right) - W_R \times D^2 + W_R \times D_L^2}{2 \times \{W_L \times (D_R - D) - W_R \times (D - D_L)\}} \times (D_R - D)\right]}{W_R}\right\}^2 + \left\{D_L - \left[\frac{W_L \times \left(2 \times W_L \times W_R + W_R^2\right) - W_R \times W_L^2 + W_L \times \left(D_R^2 - D^2\right) - W_R \times D^2 + W_R \times D_L^2}{2 \times \{W_L \times (D_R - D) - W_R \times (D - D_L)\}}\right]\right\}^2$$

STEERING CONTROL DEVICE FOR VEHICLE

CROSS REFERENCE TO RELATED APPLICATION

This application is based on Japanese Patent Application No. 2008-252544 filed on Sep. 30, 2008, the disclosure of which is incorporated herein by reference.

FIELD OF THE INVENTION

The present invention relates to a steering control device for controlling a turning angle of a steering wheel for a vehicle.

BACKGROUND OF THE INVENTION

A driving control technique for a vehicle is well known. For example, a road shape, on which the vehicle runs, is estimated. Warning information is noticed based on comparison between the estimated road shape and actual driving trajectory of the vehicle. JP-B-3720117 teaches that a device includes two CCD cameras and a stereo image processor. Two cameras are arranged on right and left sides of the vehicle, respectively. Two cameras shoot scenery and/or an object in front of the vehicle in a stereo manner so that the cameras output image signals. The image signals are processed by a triangulation method with a stereo method so that a distance to the scenery and the object is calculated. Thus, a distance image showing a three-dimensional distance distribution of the scenery and the object is formed on a whole screen. Thus, a three-dimensional shape of a road or the like is detected. Based on the road shape and an actual speed of the vehicle, the device estimates possibility to drive out from a lane of the road attributed to excessive speed before the vehicle reaches a curve of the road. If necessary, the device notices warning to a driver of the vehicle.

In the above technique, it is necessary to use two CCD cameras and the stereo image processor. Therefore, the construction of the device is complicated. Further, a process executed in the device is also complicated.

Further, JP-B-3432881 teaches that a road shape is determined based on a road map, and a turning angle of a steering wheel is controlled based on the determined road shape. The road map includes a set of coordinates of multiple nodes.

In the above technique, error of a current position of the vehicle, which is detected by a navigation device, or deficient accuracy of map information may not provide optimum control of a steering wheel angle corresponding to actual road shape.

SUMMARY OF THE INVENTION

In view of the above-described problem, it is an object of the present disclosure to provide a steering control device for controlling a turning angle of a steering wheel for a vehicle.

According to an aspect of the present disclosure, a steering control device for controlling a turning angle of a steering wheel for a vehicle includes: a position detection sensor for detecting a position of a road boundary in front of the vehicle and road accessories around the road boundary; a road curvature radius calculator for calculating an outer curvature radius of a road based on the position of the road boundary or the road accessories; a turning radius calculator for calculating an appropriate turning radius of the vehicle based on the outer curvature radius; an appropriate distance calculator for calculating an appropriate road boundary distance between a front end of the vehicle and the road boundary in front of the vehicle based on the outer curvature radius and the appropriate turning radius; an actual distance detector for detecting an actual road boundary distance between the front end of the vehicle and the road boundary in front of the vehicle based on the position of the road boundary or the road accessories; and a steering wheel angle determination element for determining acceptability of the turning angle of the steering wheel based on comparison between the appropriate road boundary distance and the actual road boundary distance.

In the above device, the outer curvature radius, the appropriate turning radius and the appropriate road boundary distance are calculated based on the position of the road boundary and/or the accessories. Further, the actual road boundary distance is also detected based on the position of the road boundary and/or the accessories. Accordingly, the device has a simple construction and executes a simple process. Further, the device determines the acceptability of the turning angle of the steering wheel with high accuracy.

BRIEF DESCRIPTION OF THE DRAWINGS

The above and other objects, features and advantages of the present invention will become more apparent from the following detailed description made with reference to the accompanying drawings. In the drawings:

FIG. 11 is a diagram showing a formula F1;

FIG. 12 is a diagram showing a formula F8; and

FIG. 13 is a diagram showing a formula F9.

DETAILED DESCRIPTION OF THE PREFERRED EMBODIMENTS

Figure 1:
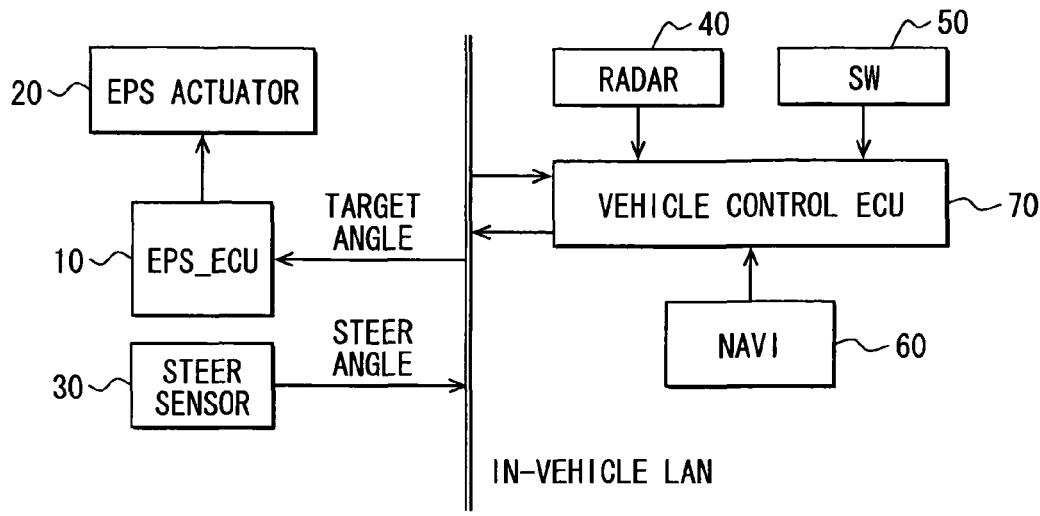
FIG. 1 is a block diagram showing a steering control device according to an example embodiment.

FIG. 1 shows a steering control device for controlling a turning angle of a steering wheel for a vehicle. In FIG. 1, EPS ECU (i.e., electric power steering electric control unit) 10 operates a EPS actuator 20 so that the turning angle of the steering wheel is controlled. The EPS actuator 20 changes the turning angle of the steering wheel based on an instruction signal from the EPS ECU 10. For example, the actuator 20 includes a reduction gear and a motor. The reduction gear rotates together with an intermediate shaft of the steering wheel. The motor rotates the reduction gear.

A turning angle sensor 30 as a steering sensor detects information about the turning angle of the steering wheel. The sensor 30 outputs a signal showing the turning angle to an in-vehicle LAN.

A radar 40 as a position detection sensor irradiates a laser beam in a predetermined range in front of the vehicle. The radar 40 receives a reflected laser beam, so that the radar 40 detects a road boundary and traffic accessories, which are disposed in front of the vehicle. Thus, the radar 40 detects a distance between the vehicle and the boundary or the accessories and a position of the boundary or the accessories. The radar 40 outputs detection result to a vehicle control ECU 70. The road accessories are, for example, a reflection plate and a traffic reflector, which reflect the laser beam from the vehicle, and generate a reflected beam having reflection strength equal to or larger than a predetermined strength. The radar 40 has a detection range in a width direction of the vehicle, which is larger than a width of the vehicle.

Operation switches 50 are operated by a driver of the vehicle. Operation information, i.e., operation signals of the switches 50 is input into the vehicle control ECU 70.

A navigation device 60 includes a position detection unit, a road map data memory unit, a display unit and a control circuit. The position detection unit includes a geomagnetic sensor, a gyroscope, a distance sensor, a GPS receiver and the like, which are not shown in FIG. 1. The GPS receiver is used for a GPS such that electric wave from a satellite so that a current position of the vehicle is detected. The road map data memory unit stores a road map data. The display includes a liquid crystal display or a CRT so that the display provide color display.

The road map data includes a link data and a node data so that a road in the map is shown as a link and a node. The link data and the node data includes a starting point and an end point of the link, a link length, a width of a traffic lane, a road width, a curvature of the road and the like. The navigation device 60 receives an instruction from the vehicle control ECU 70, and the device 60 specifies the current position of the vehicle. Further, the navigation device 60 outputs the link data and the node data of the road such as a curved road, which is disposed in a predetermined range ahead of the vehicle along with a driving route.

The ECU 70 includes a CPU, a ROM, a RAM, an I/O unit and a bus for connecting among the CPU, the ROM, the RAM and the I/O unit. The ECU 70 determines whether the actual turning angle of the steering wheel is appropriate. This determination is performed periodically with a predetermined period while the vehicle runs. When the actual turning angle of the steering wheel is not appropriate, the turning angle of the steering wheel may be automatically controlled.

The determination of acceptability of the turning angle of the steering wheel is performed according to comparison between an appropriate distance Dc to the road boundary and an actual distance D to the road boundary. Here, the appropriate distance Dc is calculated by the device. The calculation method of the appropriate distance Dc will be explained as follows.

The appropriate distance Dc is calculated based on an outer curvature radius Re of the road and an appropriate turning radius Re–L. The outer curvature radius Re means a curvature radius of the road boundary on an outside of the curved road, on which the vehicle runs. The outer curvature radius Re of a straight road can be calculated. In this case, the outer curvature radius Re of the straight road is an infinite value.

Figure 2:
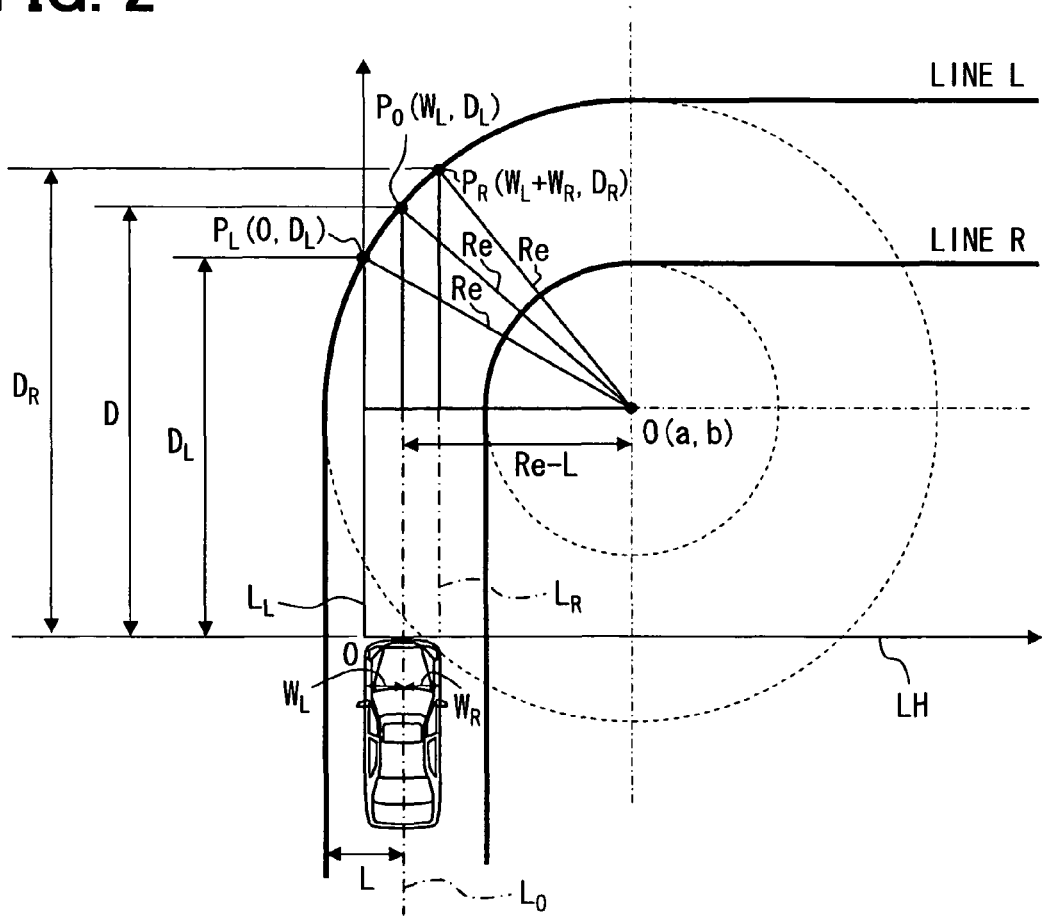
FIG. 2 is a diagram showing a relationship between an outer curvature radius and an appropriate turning radius.

The outer curvature radius Re is calculated as follows. FIG. 2 shows a relationship between the outer curvature radius Re and the appropriate turning radius Re–L. The outer curvature radius Re is detected with using a front side reference point $P_O$, a left side reference point $P_L$ and a right side reference point $P_R$, which are detected by the radar 40. The front side reference point $P_O$ is an intersection point of a center line $L_O$ of the vehicle in a vehicle width direction and the outer boundary of the road, which is defined as a line L in FIG. 2. The left side reference point $P_L$ is an intersection point of a left side offset line $L_L$ and the outer boundary of the road. The left side offset line $L_L$ is prepared by displacing the center line $L_O$ by a left side offset distance $W_L$ toward the left side of the vehicle. The right side reference point $P_R$ is an intersection point of a right side offset line $L_R$ and the outer boundary of the road. The right side offset line $L_R$ is prepared by displacing the center line $L_O$ by a right side offset distance $W_R$ toward the right side of the vehicle.

When the road accessories are formed around the outer boundary of the road, the device determines that the road accessories define the road boundary. In this embodiment, the right side offset distance $W_R$ and the left side offset distance $W_L$ are one meter. Alternatively, the right side offset distance $W_R$ and the left side offset distance $W_L$ may be shorter than one meter, or longer than one meter. Further, the right side offset distance $W_R$ may be different from the left side offset distance $W_L$.

The front side reference point $P_O$, the left side reference point $P_L$ and the right side reference point $P_R$ are defined with using coordinates having an origin, which is an intersection point of a vehicle width directional line LH and the left side offset line $L_L$. The vehicle width directional line LH passes through a front end of the vehicle, and is in parallel to the vehicle width direction.

The front side reference point $P_O$, the left side reference point $P_L$ and the right side reference point $P_R$ are assigned to the following formula F1 so that the outer curvature radius Re is calculated by the following formula F1. Here, the formula F1 is shown in FIG. 11.

The outer boundary of the road is defined as an arc of a circle, which has a center O (a, b). A line segment between the center O and the right side reference point $P_R$ provides a hypotenuse of a right triangle. One of other two sides is in parallel to the width directional line LH. The Pythagoras' theorem is applied to the above right triangle so that the formula F2 is obtained.

$$R_e^2 = (a - (W_L + W_R))^2 + (D_R - b)^2 \qquad (F2)$$
$$= a^2 - 2 \times a \times (W_L + W_R) + (W_L + W_R)^2 +$$
$$\quad D_R^2 - 2 \times b \times D_R + b^2$$
$$= a^2 - 2 \times a \times W_L - 2 \times a \times W_R + W_L^2 + 2 \times W_L \times W_R +$$
$$\quad W_R^2 + D_R^2 - 2 \times b \times D_R + b^2$$

Further, a line segment between the center O and the left side reference point $P_L$ provides a hypotenuse of a right triangle. One of other two sides is in parallel to the width directional line LH. The Pythagoras' theorem is applied to the above right triangle so that the formula F3 is obtained.

$$R_e^2 = (a - W_L)^2 + (D - b)^2 \qquad (F3)$$
$$= a^2 - 2 \times a \times W_L + W_L^2 + D^2 - 2 \times b \times D + b^2$$

A line segment between the center O and the front side reference point $P_O$ provides a hypotenuse of a right triangle. One of other two sides is in parallel to the width directional line LH. The Pythagoras' theorem is applied to the above right triangle so that the formula F4 is obtained.

$$R_e^2 = a^2 + (D_L - b)^2 \qquad (F4)$$
$$= a^2 + D_L^2 - 2 \times b \times D_L + b^2$$

The term $Re^2$ is deleted from the formula F2 and F3 so that the formula F5 is obtained.

$$-2 \times a \times W_L - 2 \times a \times W_R + W_L^2 + 2 \times W_L \times W_R + W_R^2 + \qquad (F5)$$
$$D_R - 2 \times b \times D_R = -2 \times a \times W_L + W_L^2 + D^2 - 2 \times b \times D$$
$$-2 \times a \times W_R + 2 \times W_L + W_R + W_R^2 + D_R^2 - 2 \times b \times D_R = D^2 - 2bD$$
$$2 \times a \times W_R - (2 \times W_L \times W_R + W_R^2) + D^2 - D_R^2 + 2 \times b \times (D_R - D) = 0$$
$$2 \times a \times W_R - (2 \times W_L \times W_R + W_R^2) -$$
$$(D_R^2 - D^2) + 2 \times b \times (D_R - D) = 0$$
$$2 \times a \times W_R = (2 \times W_L \times W_R + W_R^2) + D_R^2 - D^2 - 2 \times b \times (D_R - D)$$
$$2 \times a = \frac{(\times W_L \times W_R + W_R^2) + (D_R^2 - D^2) - 2 \times b \times (D_R - D)}{W_R}$$

Further, the term $Re^2$ is deleted from the formula F3 and F4 so that the formula F6 is obtained.

$$-2 \times a \times W_L + W_L^2 + D^2 - 2 \times b \times D = D_L^2 - 2 \times b \times D_L \qquad (F6)$$
$$2 \times a \times W_L = W_L^2 - 2 \times b \times (D - D_L) + D^2 - D_L^2$$
$$2 \times a = \frac{W_L^2 - 2 \times b \times (D - D_L) + D^2 - D_L^2}{W_L}$$

The term "2×a" is deleted from the formula F5 and F6 so that the formula F7 is obtained.

$$\frac{(2 \times W_L \times W_R + W_R^2) + (D_R^2 - D^2) - 2 \times b \times (D_R - D)}{W_R} = \qquad (F7)$$
$$\frac{W_L^2 - 2 \times b \times (D - D_L) + D^2 - D_L^2}{W_L}$$
$$W_L \times \{(2 \times W_L \times W_R + W_R^2) + (Dr^2 - D^2) - 2 \times b \times (D_R - D)\} =$$
$$W_R \times \{W_L^2 - 2 \times b \times (D - D_L) + D^2 - D_L^2\}$$
$$W_L \times (2 \times W_L \times W_R + W_R^2) +$$
$$W_L \times (D_R^2 - D^2) - W_L \times 2 \times b \times (D_R - D) =$$
$$W_R \times W_L^2 - W_R \times 2 \times b \times (D - D_L) + W_R \times D^2 - W_R \times D_L^2$$
$$W_L \times (2 \times W_L \times W_R + W_R^2) - W_R \times W_L^2 + W_L \times (D_R^2 - D^2) - W_R \times D^2 +$$
$$W_R \times D_L^2 = W_L \times 2 \times b \times (D_R - D) - W_R \times 2 \times b \times (D - D_L)$$
$$W_L \times (2 \times W_L \times W_R + W_R^2) - W_R \times W_L^2 + W_L \times (D_R^2 - D^2) -$$
$$W_R \times D^2 + W_R \times D_L^2 = 2 \times b \times \{W_L \times (D_R - D) - W_R \times (D - D_L)\}$$

-continued $$b = \frac{\begin{array}{c}W_L \times (2 \times W_L \times W_R + W_R^2) - W_R \times W_L^2 + \\ W_L \times (D_R^2 - D^2) - W_R \times D^2 + W_R \times D_L^2\end{array}}{2 \times \{W_L \times (D_R - D) - W_R \times (D - D_L)\}}$$

The formula F5 is substituted into the formula F7 so that the formula F8 is obtained. The formula F8 is shown in FIG. 12.

The appropriate turning radius Re-L is obtained by subtracting a distance L from the outer curvature radius Re, which is calculated by the formula F1.

Further, the formula F7 and F8 are substituted into the formula F4 so that the formula F9 is obtained. The square root of the both sides of the formula F9 is calculated so that the formula F1 is obtained. Here, the formula F9 is shown in FIG. 13.

The distance L is defined as spacing between the outer road boundary in the road width direction and the center line $L_O$. In this embodiment, the distance L is set to be a predetermined value (e.g., 1.75 m) as an example value. This value is a half of the road width of a conventional traffic lane. This value may be varied according to the actual road width based on the width of the traffic lane and/or the road width, which are stored in the map data in the navigation device 60. Alternatively, the distance L may be measured by a laser beam sensor.

The appropriate road boundary distance Dc is calculated with the formula F10. Similar to the formula F4, the formula F10 is obtained as follows.

The line segment between the center O and the front side reference point $P_O$ provides a hypotenuse of a right triangle. One of other two sides is in parallel to the width directional line LH. The Pythagoras' theorem is applied to the above right triangle so that the formula F10 is obtained. Thus, the appropriate road boundary distance Dc is spacing between the front end of the vehicle and the outer road boundary disposed in front of the vehicle when the vehicle drives on a circular path of the circle having the appropriate curvature radius Re-L. Here, when the road is straight, the formula of "$Re^2 \approx (Re-L)^2$" is satisfied, and thereby, the appropriate road boundary distance Dc becomes an infinite value (i.e., $Dc \approx \infty$).

$$Dc = \sqrt{Re^2 - (Re-L)^2} \qquad (F10)$$

Next, the determination of acceptability of the turning angle of the steering wheel will be explained as follows. The appropriate road boundary distance Dc means the spacing between the front end of the vehicle and the outer road boundary disposed in front of the vehicle when the vehicle drives on a circular path of the circle having the appropriate curvature radius Re-L. The actual road boundary distance D is spacing between the front end of the vehicle and the outer road boundary disposed in front of the vehicle.

Figure 3:
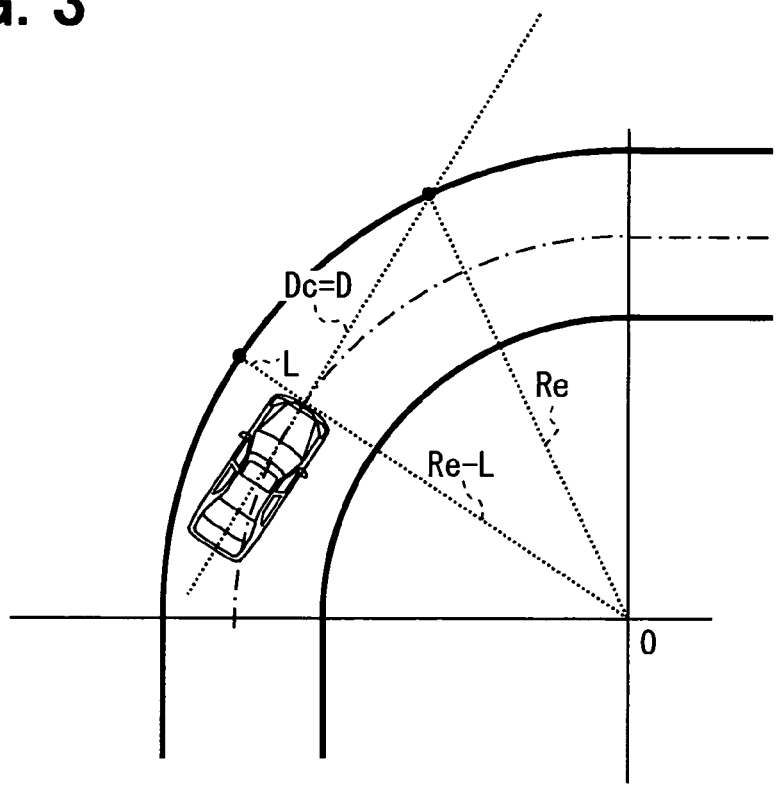
FIG. 3 is a diagram showing an appropriate road boundary distance when a vehicle passes through a curve road.
Figure 4:
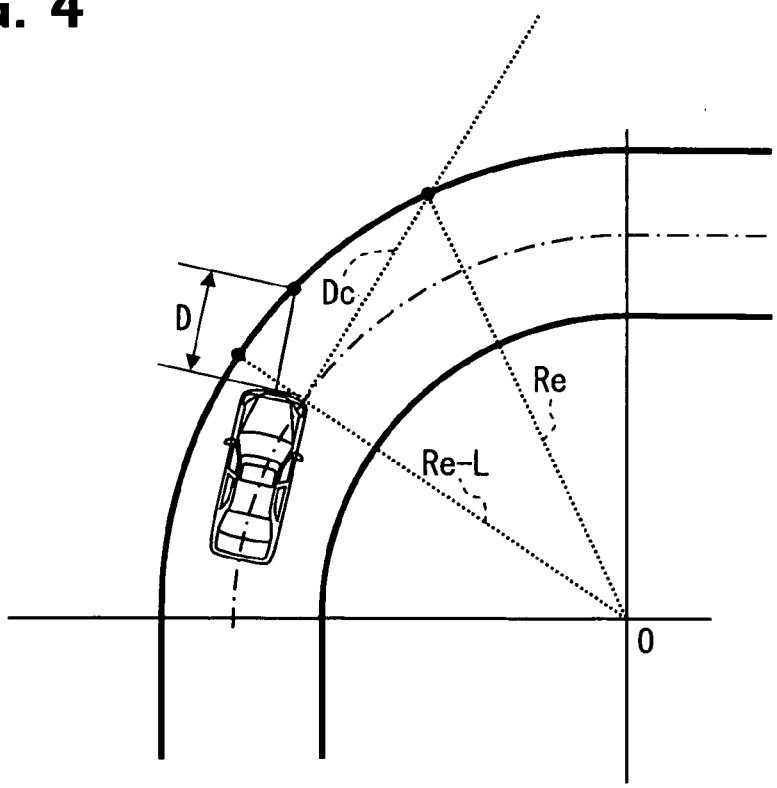
FIG. 4 is a diagram showing a case where the vehicle runs out of a circular path defined by the appropriate curvature radius.

FIG. 3 shows the appropriate road boundary distance Dc when the vehicle passes through the curve road. In FIG. 3, the vehicle runs on the circular path of the circle having the appropriate curvature radius Re-L. When the vehicle runs on the circular path of the circle having the appropriate curvature radius Re-L, the actual road boundary distance D is equal to the appropriate road boundary distance Dc. However, as shown in FIG. 4, when the vehicle runs on a circular path of a circle, which is disposed outside of the circle having the appropriate curvature radius Re-L, the actual road boundary distance D is shorter than the appropriate road boundary distance Dc. In this case, when the vehicle continues to run on the circular path of the circle, which is disposed outside of the circle having the appropriate curvature radius Re−L, the vehicle may collide with the outer road boundary, or run out of the road.

Figure 5:
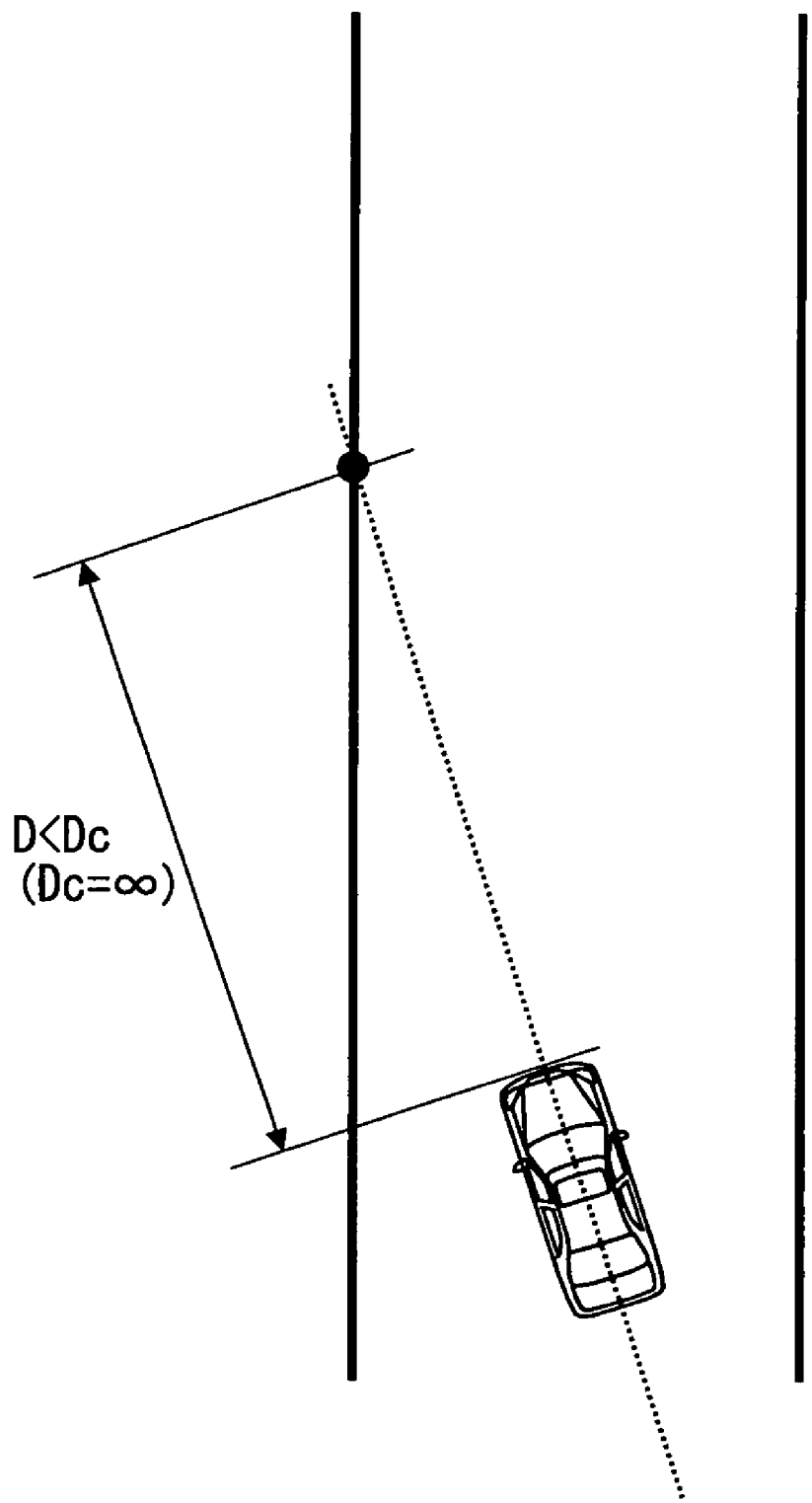
FIG. 5 is a diagram showing a case where the vehicle runs toward a road boundary.

Accordingly, the device compares the actual road boundary distance D with the appropriate road boundary distance Dc. When the device determines that the actual road boundary distance D is shorter than the appropriate road boundary distance Dc, the device determines that the steering wheel angle is not appropriate. The appropriate road boundary distance Dc of the straight road is an infinite value. Accordingly, as shown in FIG. 5, when the vehicle runs toward the road boundary on the straight road, the actual road boundary distance D is shorter than the appropriate road boundary distance Dc. Accordingly, when the vehicle runs in a state shown in FIG. 5, the device determines that the steering wheel angle is not appropriate.

Figure 6:
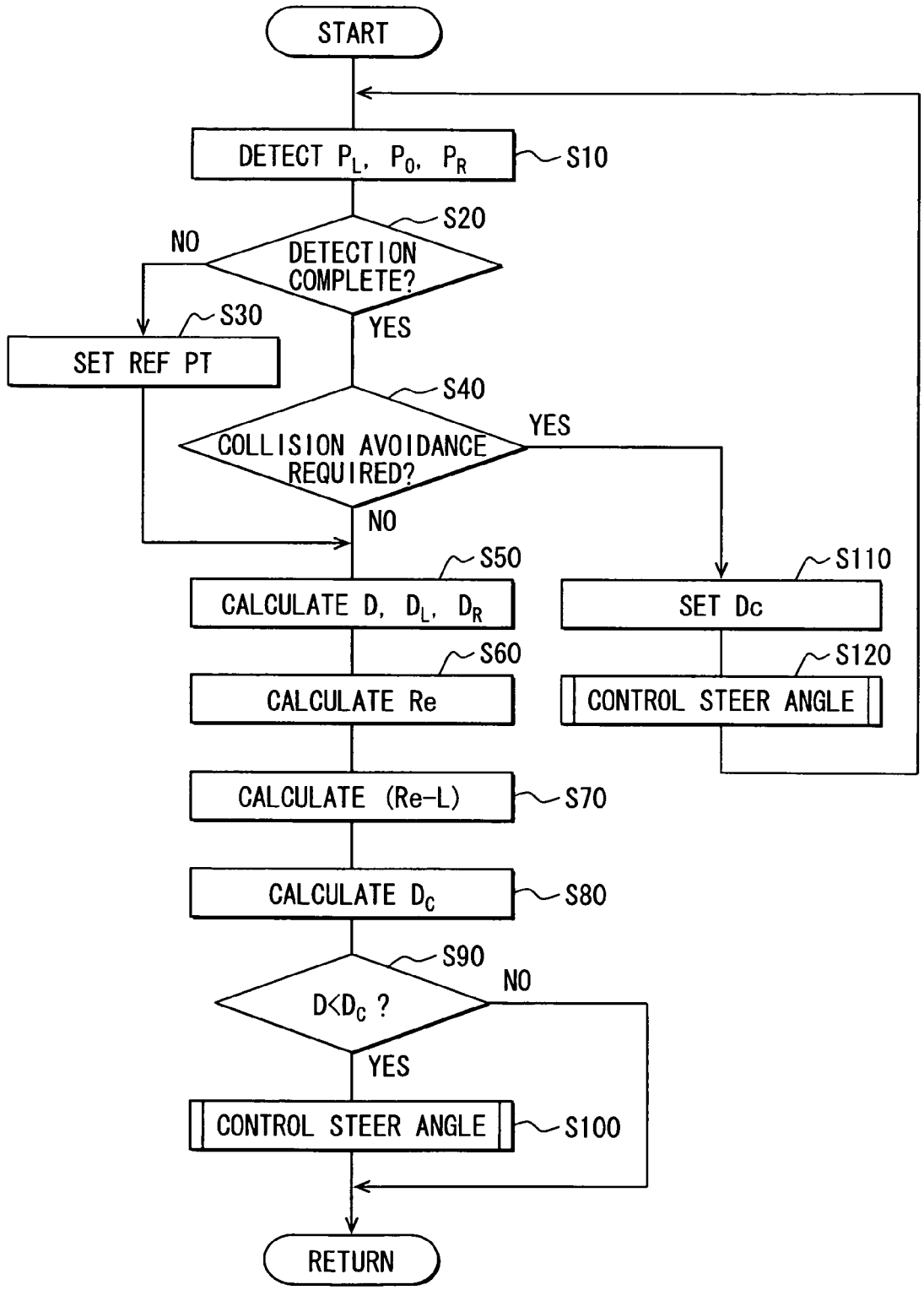
FIG. 6 is a flowchart showing a process executed in a vehicle control ECU.

The vehicle control ECU 70 executes the process shown in FIG. 6. The process is executed repeatedly with a predetermined period.

Step S10 provides a reference point detection step, and the front side reference point $P_O$, the left side reference point $P_L$ and the right side reference point $P_R$ are detected by using the radar 40. In Step S10, all of the three reference points may not be always detected. Further, another part of the outer road boundary may be detected. In this case, the reference point is determined with using a position of the detected other part of the outer road boundary.

In Step S20, the device determines whether all of the front side reference point $P_O$, the left side reference point $P_L$ and the right side reference point $P_R$ are detected. When all of the reference points $P_O$, $P_L$, $P_R$ are detected, the device determines as "YES" in Step S20, and then, it goes to Step S40. When at least one of the reference points $P_O$, $P_L$, $P_R$ is not detected, the device determines as "NO" in Step S20, and then, it goes to Step S30.

Figure 7:
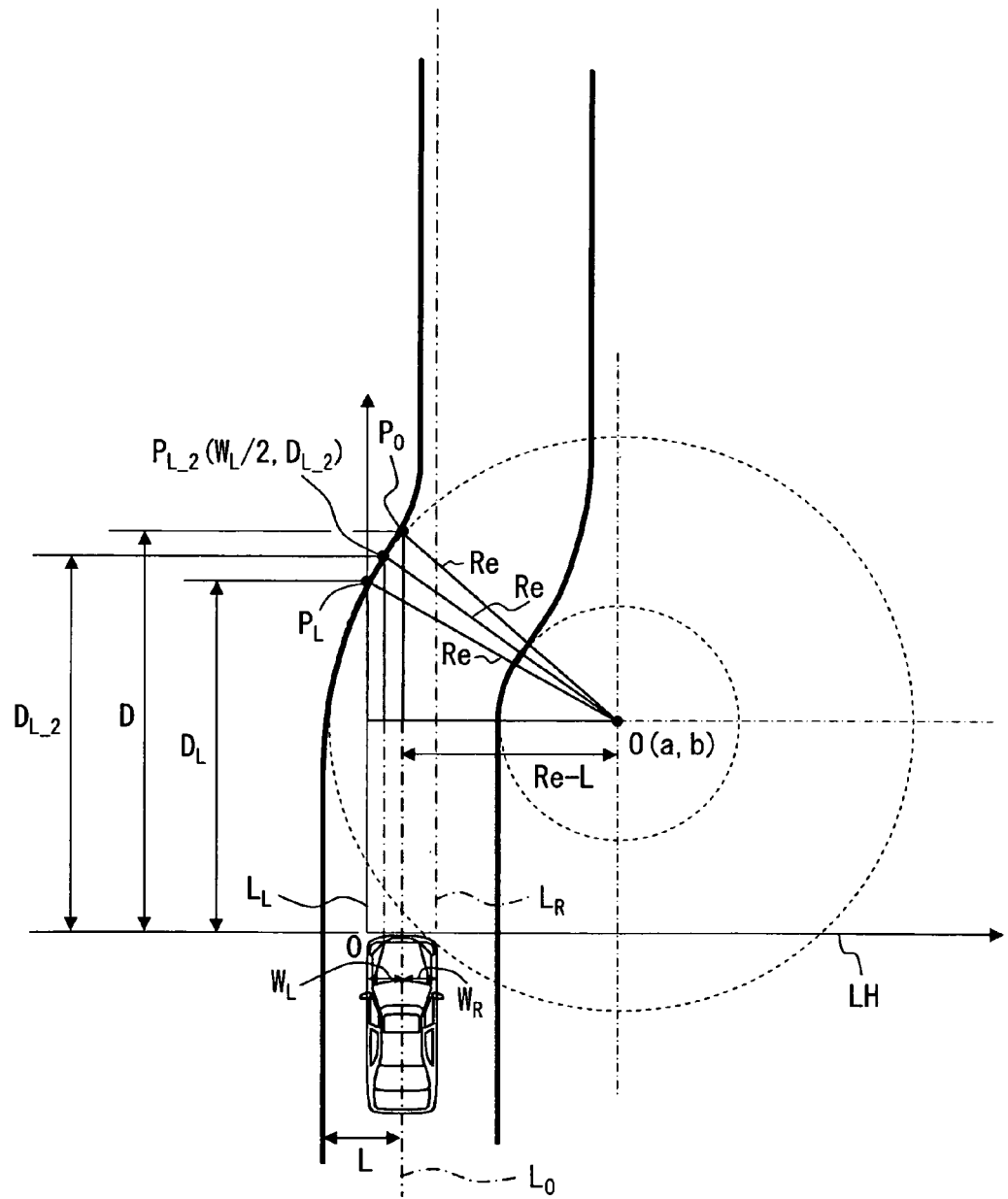
FIG. 7 is a diagram showing a case where a road boundary is not on a right side offset line.

In Step S30, the at least one of the reference points $P_O$, $P_L$, $P_R$ not detected is determined so as to define all of the three reference points $P_O$, $P_L$, $P_R$ including the detected reference points $P_O$, $P_L$, $P_R$. For example, as shown in FIG. 7, when there is no road boundary along with the right side offset line $L_R$, the device cannot detect the right side reference point $P_R$. In this case, a middle line for dividing spacing between the center line $P_O$ and the left side offset line $L_L$ is defined. An intersection point $P_{L2}$ between the middle line and the outer road boundary is determined as a reference point in place of the right side offset line $L_R$. The position of the intersection $P_{L2}$ is determined by using the radar 40. Alternatively, the substitution of the right side reference point $P_R$ may be determined as a middle point between the front side reference point $P_O$ and the left side reference point $P_L$ by using an interpolation method with the front side reference point $P_O$ and the left side reference point $P_L$. Thus, when only two reference points $P_O$, $P_L$, $P_R$ are detected, the third reference point not detected may be determined as a middle point between two reference points, a detected point between two reference points or an interpolation point. Further, even when more than one reference point are not detected, the three reference points $P_O$, $P_L$, $P_R$ may be determined by an interpolation method with detected outer road boundaries. After Step S30, it goes to Step S50.

Figure 8:
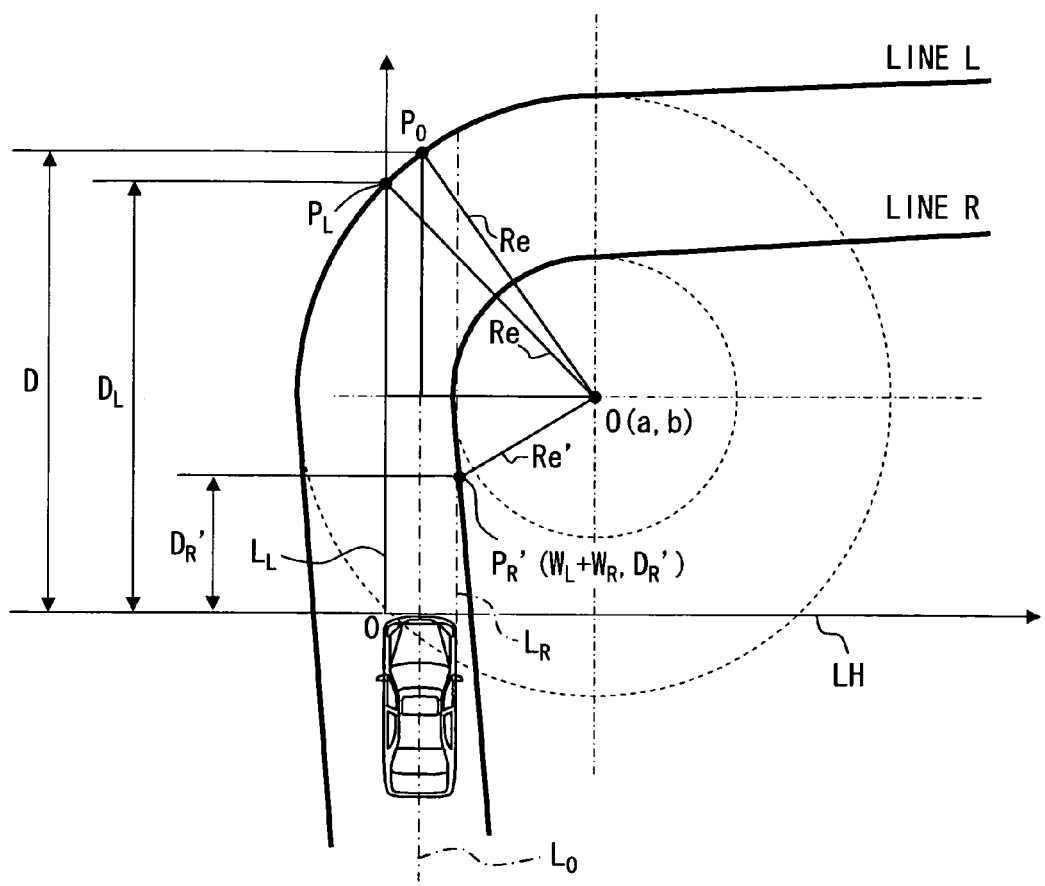
FIG. 8 is a diagram showing a case where collision avoid behavior is necessary.

When the device determines as "YES" in Step S20, it proceeds to Step S40. Step S40 is a distance relationship determination step so that the device determines whether collision avoidance behavior is necessary. A case where the collision avoidance behavior is necessary is such that, as shown in FIG. 8, one of reference points detected in Step S10 is on the inner road boundary. In FIG. 8, the reference point $P_R'$, the inner curvature radius Re', and the coordinate $D_R'$ relate to the inner road boundary so that they are distinguished by using an apostrophe (').

In FIG. 8, when the steering wheel angle is controlled to drive the vehicle along with the curve road shape ahead of the vehicle, the vehicle may collide with the inner road boundary, or run out of the road. Thus, steering wheel control is performed so as to avoid collision.

Specifically, a distance $D_L$ is defined from the vehicle to the left side reference point $P_L$, a distance D is defined from the vehicle to the front side reference point $P_O$, and the distance $D_R$ is defined from the vehicle to the right side reference point $P_R$. When the magnitude relationship among the distances $D_L$, D, and $D_R$ has an ascending order or a descending order, i.e., the relationship of "$D_L<D<D_R$" or "$D_L>D>D_R$," all of the three reference points is on the outer road boundary. Therefore, in this case, the device determines that it is not necessary to perform collision avoidance behavior. Thus, in Step S40, the device determines as "NO." Then, it proceeds to Step S50. However, when magnitude relationship among the distances $D_L$, D, and $D_R$ does not have the ascending order or the descending order, the device determines as "YES" in Step S40. Then, it proceeds to Step S110.

In Step S50, the distance $D_L$ from the vehicle to the left side reference point $P_L$, the distance D from the vehicle to the front side reference point $P_O$, and the distance $D_R$ from the vehicle to the right side reference point $P_R$ are calculated. Here, the distance D is an actual distance from the front end of the vehicle to the outer road boundary in front of the vehicle. Accordingly, the distance D is an actual road boundary distance. Step S50 corresponds to an actual distance calculation step.

Step S60 is a road curvature radius calculation step. In Step S60, the distances $D_L$, D and $D_R$, and the left side offset distance WL and the right side offset distance $W_R$ are assigned into the formula F1 so that the outer curvature radius Re is calculated.

Step S70 is a turning radius calculation step. The appropriate turning radius Re−L is calculated by subtracting the distance L between the center line and the road boundary from the outer curvature radius Re.

Step S80 is an appropriate distance calculation step. The appropriate road boundary distance Dc is calculated by assigning the outer curvature radius Re and the appropriate turning radius Re−L into the formula F10.

In Step S90, the device compares the appropriate road boundary distance Dc with the actual road boundary distance D. When the actual road boundary distance D is equal to or larger than the appropriate road boundary distance Dc, the device determines as "NO" in Step S90. In this case, the steering wheel angle is appropriate. Therefore, without controlling the steering wheel angle, the process in FIG. 6 ends.

Figure 9:
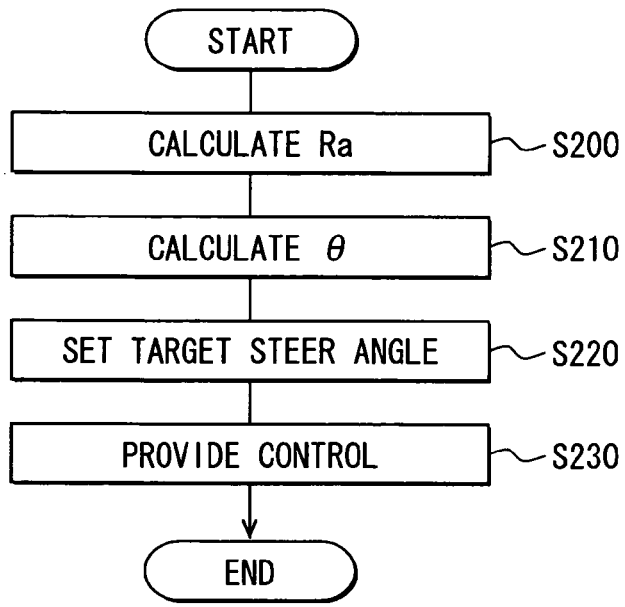
FIG. 9 is a flowchart showing control of a steering wheel angle.

When the actual road boundary distance D is smaller than the appropriate road boundary distance Dc, the device determines as "YES" in Step S90. Then, it proceeds to Step S100. Steps S90 and S40 provide a determination step of acceptability of the turning angle of the steering wheel. In Step S100, control of the steering wheel angle is performed. FIG. 9 shows a flowchart of the control of the steering wheel angle. In Step S200, an estimated outer curvature radius Ra is calculated from the formula F11.

$$Ra = \frac{Dc^2 + L^2}{2 \times L} \qquad \text{(F11)}$$

Figure 10:
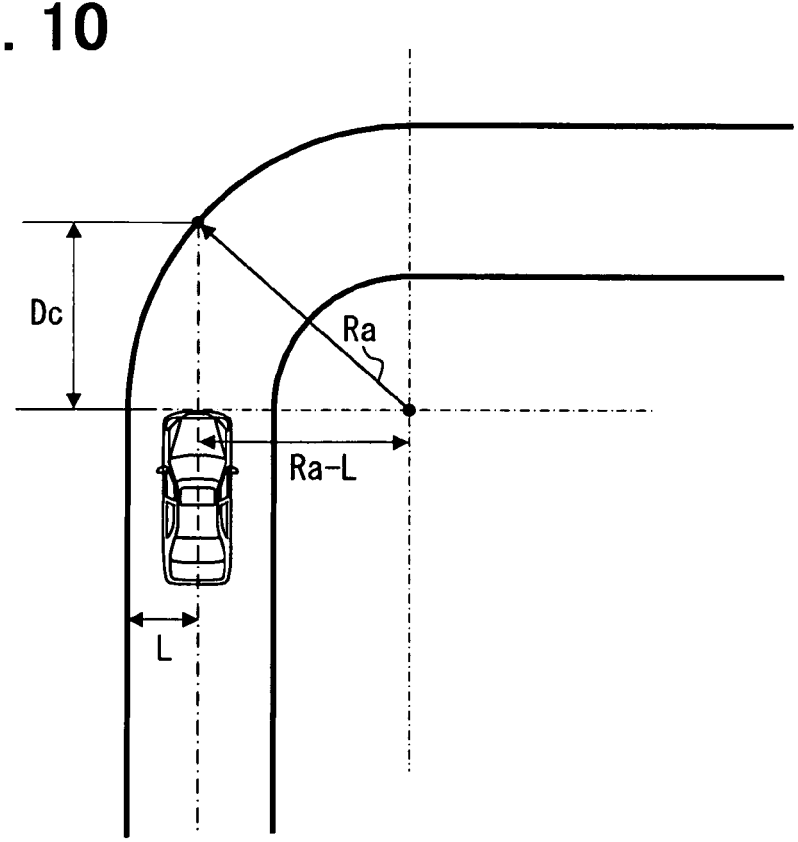
FIG. 10 is a diagram showing a right triangle for calculating an estimated outer curvature radius.

The estimated outer curvature radius Ra relates to the control of the steering wheel angle. The outer curvature radius Re relates to the determination of acceptability of the turning angle of the steering wheel. Thus, the estimated outer curvature radius Ra is different from the outer curvature radius Re. Alternatively, the outer curvature radius Re may be used for the control of the steering wheel angle. In this case, the estimated outer curvature radius Ra is equal to the outer curvature radius Re. Here, the formula F11 is also obtained by using the Pythagoras' theorem of a right triangle shown in FIG. 10.

In Step S210, the estimated outer curvature radius Ra is assigned to the formula F12 so that a tire turning angle θ is calculated. Here, WB represents a wheel base of the vehicle.

$$\theta = \frac{180 \times WB}{\pi \times (Ra - L)} [\text{deg}] \quad (F12)$$

In Step S220, the tire turning angle θ is assigned to the formula F13 so that a target steering wheel angle Θ is obtained. N represents a ratio between the tire turning angle θ and a turning angle of the steering wheel. The ratio is constant in general. Here, Steps S200 to S220 provide a target steering wheel angle setting step.

$$\Theta = N \times \theta \quad (F13)$$

Step S230 provides a steering wheel angle control step. In Step S230, the steering wheel angle is actually controlled. Specifically, the target steering wheel angle Θ is input to the EPS ECU 10. The EPS ECU 10 controls the EPS actuator 20 so that the steering wheel angle is changed closer to the target steering wheel angle Θ with a predetermined change speed while the ECU 10 detects the steering wheel angle with using the turning angle sensor 30.

In Step S110 of FIG. 6, the shortest distance among the three distances $D_L$, D and $D_R'$ (or $D_R$) is set to the appropriate road boundary distance Dc. In an example case in FIG. 8, the shortest distance is the distance $D_R'$. It proceeds to Step S120 so that the steering wheel angle control step is performed. The steering wheel angle control is similar to Step S100. In Step S120, the steering wheel angle control is performed, so that the driving direction of the vehicle is gradually changed to a direction along with the road shape. Thus, the device controls the vehicle to avoid collision with the road inner boundary. When all of the three reference points $P_O$, $P_L$ and $P_R$ are on the road outer boundary, the device determines as "NO" in Step S40. In this case, it proceeds to Step S50.

Based on the position of the road boundary and the like detected by the radar 40, the outer curvature radius Re, the appropriate turning radius Re–L and the appropriate road boundary distance Dc are calculated in order. Thus, all of the outer curvature radius Re, the appropriate turning radius Re–L and the appropriate road boundary distance Dc are calculated from the position of the road boundary and the like, which is detected by the radar 40. Further, the actual road boundary distance D is also calculated from the position of the road boundary and the like, which is detected by the radar 40. Accordingly, the steering control device has a simple structure and a simple controlling process for the steering wheel angle.

The information for determining whether the steering wheel angle is appropriate is obtained based on the position of the road boundary and the like, which is actually detected by the radar 40. Thus, the device can determine the acceptability of the turning angle of the steering wheel with high accuracy, compared with a case where the road shape is calculated from the map data, and the acceptability of the turning angle of the steering wheel is determined based on the road shape obtained from the map data.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A vehicle steering control device comprising:
a position detection sensor for detecting a position of a road boundary of a road disposed in front of a vehicle and positions of road accessories arranged around the road boundary;
a road curvature radius calculation device for calculating an outer curvature radius of the road based on the positions of the road boundary and the road accessories detected by the position detection sensor;
a turning radius calculation device for calculating an appropriate turning radius of the vehicle running on the road based on the outer curvature radius calculated by the road curvature radius calculation device;
an appropriate distance calculation device for calculating an appropriate road boundary distance, which is defined by an appropriate distance between a front end of the vehicle and an outer road boundary disposed in front of the vehicle, based on the outer curvature radius and the appropriate turning radius;
an actual distance calculation device for calculating an actual road boundary distance, which is defined by an actual distance between the front end of the vehicle and the outer road boundary disposed in front of the vehicle, based on the positions of the road boundary and the road accessories arranged around the road boundary detected by the position detection sensor; and
a steering wheel angle acceptability determination device for determining acceptability of a steering wheel angle based on comparison between the appropriate road boundary distance and the actual road boundary distance.

2. The vehicle steering control device according to claim 1, further comprising:
a reference point detection device for detecting a front reference point, a left side reference point and a right side reference point with using the position detection sensor, wherein the front reference point is an intersection between the outer road boundary and a center line of the vehicle along with a vehicle width direction of the vehicle, wherein the left side reference point is an intersection between the outer road boundary and a left side offset line, which is prepared by displacing the center line in the vehicle width direction by a left side offset distance defined by $W_L$ toward a left side of the vehicle in the vehicle width direction, wherein the right side reference point is an intersection between the outer road boundary and a right side offset line, which is prepared by displacing the center line in the vehicle width direction by a right side offset distance defined by $W_R$ toward a right side of the vehicle in the vehicle width direction,
wherein the road curvature radius calculation device calculates the outer curvature radius from a following formula (1), wherein the formula (1) is $$Re = \sqrt{\left[\frac{1}{2}\left(\frac{(2 \times W_L \times W_R + W_R^2) + (D_R^2 - D^2) - 2 \times A \times (D_R - D)}{W_R}\right)\right]^2 + (D_L - B)^2}$$

and $$A = \frac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}}$$

and $$B = \frac{W_L \times (2 \times W_L \times W_R + W_R^2) - W_R \times W_L^2 + W_L \times (D_R^2 - D^2) - W_R \times D^2 + W_R \times D_L^2}{2 \times \{W_L \times (D_R - D) - W_R \times (D - D_L)\}}$$

and wherein D represents a distance between the front end of the vehicle and the front reference point, $D_L$ represents a distance between the front end of the vehicle and the left side reference point, and $D_R$ represents a distance between the front end of the vehicle and the right side reference point.

3. The vehicle steering control device according to claim 2, further comprising:

a target angle setting device for setting a target steering wheel angle when the steering wheel angle determination device determines that the steering wheel angle is not appropriate, wherein an estimated outer curvature radius defined by Ra is calculated with using the appropriate road boundary distance calculated by the appropriate distance calculation device and a formula (2) of:

$$Ra = \frac{Dc^2 + L^2}{2 \times L}$$

wherein Dc represents the appropriate road boundary distance, and L represents a distance between the road boundary and the center line in the vehicle width direction, wherein a tire turning angle defined by θ is calculated with using the estimated outer curvature radius of Ra and a formula (3) of:

$$\theta = \frac{180 \times WB}{\pi \times (Ra - L)} [\deg]$$

wherein WB represents a wheelbase of the vehicle, and is defined by meter, wherein the target steering wheel angle defined by Θ with using the tire turning angle and a formula (4) of:

$$\Theta = N \times \theta$$

wherein N represents a ratio between the tire turning angle of θ and a steering wheel angle of Θ, which provides the target steering wheel angle; and a steering wheel angle control device for controlling the steering wheel angle based on the target steering wheel angle set by the target angle setting device.

4. The vehicle steering control device according to claim 3, wherein:

the steering wheel angle acceptability determination device includes a distance relationship determination device for determining periodically whether a magnitude relationship among three distances of $D_L$, D, and $D_R$ is an ascending order or a descending order of $D_L$, D, and $D_R$ when the reference point detection device detects all of three reference points;

the steering wheel angle acceptability determination device determines that the steering wheel angle is not appropriate when the distance relationship determination device determines that the magnitude relationship among three distances of $D_L$, D, and $D_R$ is not the ascending order and the descending order of $D_L$, D, and $D_R$;

the target angle setting device sets the target steering wheel angle with using the shortest distance among three distances of $D_L$, D, and $D_R$ as the appropriate road boundary distance when the distance relationship determination device determines that the magnitude relationship among three distances of $D_L$, D, and $D_R$ is not the ascending order and the descending order of $D_L$, D, and $D_R$; and the target angle setting device sets the target steering wheel angle with using the appropriate road boundary distance calculated by the appropriate distance calculation device when the distance relationship determination device determines that the magnitude relationship among three distances of $D_L$, D, and $D_R$ is the ascending order or the descending order of $D_L$, D, and $D_R$.

5. The vehicle steering control device according to claim 2, wherein:

when the reference point detection device does not detect at least one of the front reference point, the left side reference point and the right side reference point, the road curvature radius calculation device substitutes another point on the outer road boundary as a reference point for the at least one of the front reference point, the left side reference point and the right side reference point, which is not detected, so that the road curvature radius calculation device calculates the outer curvature radius.

* * * * *